United States Patent
Bent et al.

(10) Patent No.: US 10,558,618 B1
(45) Date of Patent: Feb. 11, 2020

(54) METADATA COMPRESSION

(71) Applicant: EMC Corporation, Hopkinton, MA (US)

(72) Inventors: John M. Bent, Los Alamos, NM (US); Sorin Faibish, Newton, MA (US); Zhenhua Zhang, Beijing (CN); Jun He, Madison, WI (US); Aaron Torres, Seattle, WA (US); Gary Grider, Los Alamos, NM (US)

(73) Assignees: EMC IP Holding Company LLC, Hopkinton, MA (US); Triad National Security, LLC, Los Alamos, NM (US)

( * ) Notice: Subject to any disclaimer, the term of this patent is extended or adjusted under 35 U.S.C. 154(b) by 1030 days.

(21) Appl. No.: 14/041,872

(22) Filed: Sep. 30, 2013

(51) Int. Cl.
  *G06F 16/17* (2019.01)
  *G06F 16/174* (2019.01)
  *G06F 16/13* (2019.01)

(52) U.S. Cl.
  CPC .......... *G06F 16/1744* (2019.01); *G06F 16/13* (2019.01)

(58) Field of Classification Search
  CPC ......... G06F 17/30067; G06F 17/30153; G06F 17/30091; G06F 16/2228; G06F 16/2255; G06F 16/2358; G06F 16/288; G06F 16/9014
  See application file for complete search history.

(56) References Cited

U.S. PATENT DOCUMENTS 5,850,565 A * 12/1998 Wightman .......... H03M 7/3084 710/1
9,286,261 B1 * 3/2016 Tzelnic ................. G06F 15/167

OTHER PUBLICATIONS

He et al. "Discovering Structure in Unstructured I/O" Nov. 3, 2012.*
Bent et al. "PLFS: A Checkpoint Filesystem for Parallel Applications", copyright 2009 ACM.*
Polte et al. "And eat it too: High read performance in write-optimized HPC I/O middleware file formats", copyright 2009 ACM.*
Walkins et al. "DataMods: Programmable Fille System Services", University of California, Santa Cruz, Nov. 9, 2012.*
Manzanares et al. "Reducing Concurrency Bottlenecks in Parallel I/O Workloads" Apr. 15, 2011.*

* cited by examiner

*Primary Examiner* — Apu M Mofiz
*Assistant Examiner* — Cindy Nguyen
(74) *Attorney, Agent, or Firm* — Ryan, Mason & Lewis, LLP (57) ABSTRACT

A computer-executable method, system, and computer program product for managing a Parallel-Logged File System (PLFS) on a data storage system, wherein the data storage system is in communication with an application that updates the data storage system with checkpoint data, the computer-executable method, system, and computer program product comprising receiving a first checkpoint including data from the application; analyzing the data in the first checkpoint to determine whether a pattern exists in the checkpoint data; and upon a positive determination, adding the pattern into PLFS.

20 Claims, 8 Drawing Sheets

METADATA COMPRESSION

STATEMENT OF GOVERNMENT RIGHTS

This invention was made with government support under Contract No. 89233218CNA000001 awarded by the U.S. Department of Energy/National Nuclear Safety Administration. The government has certain rights to this invention.

METADATA COMPRESSION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A computer-executable method, system, and computer program product for managing a Parallel-Logged File System (PLFS) on a data storage system, wherein the data storage system is in communication with an application that updates the data storage system with checkpoint data, the computer-executable method, system, and computer program product comprising receiving a first checkpoint including data from the application; analyzing the data in the first checkpoint to determine whether a pattern exists in the checkpoint data; and upon a positive determination, adding the pattern into PLFS.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Traditionally, many large data storage systems use a logged file system to facilitate fast writes to a large data storage system. Generally, as a large data storage system stores an increasing amount of data, a logged file system slows down due to increasing amounts of metadata created from storing data using the logged file structure. Typically, when an amount of data stored is small (i.e., 100-200 TB) metadata is not an issue, however, as an amount of data stored increases so does the metadata used for each I/O. Generally, solutions to improve performance of logged structure file systems to increase read and write efficiency would be useful and may not have been previously possible.

Traditionally, check pointing is a predominant storage driver in today's peta-scale supercomputers and can be expected to remain as such in future exa-scale supercomputers. Typically, users prefer to checkpoint into a shared file, yet parallel file systems often perform poorly for shared file writing. Generally, a powerful technique to address this problem is to transparently transform shared file writing into many exclusively written as is done in systems such as a Parallel Logged File System (PLFS). Traditionally, however, the metadata to reconstruct the fragments into the original file grows with the number of writers. Typically, implementations of PLFS are not able to scale to exa-flop supercomputers due to the large overhead of creating and reassembling the metadata.

Traditionally, in PLFS, when an application makes many small writes, the size of the index will become correspondingly large. Typically, a large index file will consume a significant amount of memory when an application reads a PLFS file due to storing the indices in memory. Generally, to use less memory, an alternate option is to not cache the entire index data but to access them on disk whenever it is necessary. Traditionally, however, accessing a PLFS index from disk will be very slow because PLFS has to conduct I/O for each index access.

Traditionally, PLFS is a virtual FUSE file system, mounted on the compute nodes, situated between the parallel application and an underlying parallel file system responsible for data storage. Typically, as PLFS is a virtual file system, it leverages services provided by the underlying parallel file system, such as redundancy, high availability, and globally distributed data store. Generally, leveraging an underlying parallel file system frees PLFS to focus rearranging application data so the N-to-1 write pattern is better suited for the underlying parallel file system.

Traditionally, for every logical PLFS file created, PLFS creates a container structure on the underlying parallel file system. Typically, the structure of a container is a hierarchical directory tree consisting of a single top level directory and multiple sub-directories that appears to users. Generally, multiple processes opening the same logical file for writing share the container, although each opening gets a unique data file within the container into which all I/O bits writes are appended. Traditionally, by giving each writing process in a parallel application access to a non-shared data file, PLFS converts a N-to-1 write access pattern into a N-to-N write access pattern. Generally, when a process writes to the file, the write is appended to its data file and a record identifying the write is appended to an index file.

Traditionally, PLFS rearranging data improves write bandwidths, but also introduces additional complexity for reads. Typically, in order to read each logical file, PLFS maintains an index file for each compute node which records the logical offset and length of each write. Generally, PLFS constructs a global index by aggregating the multiple index files into an offset lookup table. Conventionally, the global offset is constructed as needed to satisfy read operations and lookup operations when cached metadata is not available.

In many embodiments, the current disclosure may enable efficient use of metadata in a logged file system. In various embodiments, the current disclosure may enable a logged file system to reduce an amount of metadata required to reference data stored within the logged file system. In certain embodiments, the current disclosure may enable a host application and/or user to access data within a logged file system more quickly. In other embodiments, the current disclosure may enable a host application and/or user to write data within a logged file system more quickly.

In many embodiments, a logged file system may be a Parallel Logged file system (PLFS). In various embodiments, PLFS may produce a very large amount of metadata in order to resolve reads. In certain embodiments, metadata may be in the form of index files which may contain one entry for every write specifying the size, the timestamp, the offset, and the physical location of a write and its associated data. In some embodiments, PLFS index files may be read into memory in order to resolve reads from the logged file system. In certain embodiments, resolving a read may include searching metadata for information on a portion of data stored with a logged file system and retrieving the data.

In many embodiments, the current disclosure may enable PLFS to manage and interact with large datasets by reducing the size of the PLFS's metadata index. In various embodiments, the current disclosure may enable a PLFS to compress the metadata index. In certain embodiments, the current disclosure may enable applications with N-to-1 type of I/O patterns to read and/or write data to a data storage system more efficiently. In some embodiments, the current disclosure may enable PLFS to minimize the size of a metadata index memory footprint. In other embodiments the current disclosure may enable implementation of formula index compression.

In many embodiments, the current disclosure may enable implementation of algorithms by which patterns in a PLFS metadata index may be discovered and then may be used to reduce the amount of metadata stored within an index. In various embodiments, the use of patterns within PLFS may enable a reduction in the size of metadata created by several orders of magnitude, may enable an increase of the performance of writes by up to forty percent, and may enable an increase of the performance of reads by up to 480 percent.

In many embodiments, pattern PLFS initially buffers raw single entry PLFS indices for each process. In various embodiments, after initially buffering PLFS indices, a structure discovering engine may start processing the raw indices and may put the generated pattern structure entries into a pattern index buffer and non-pattern ones to non-pattern indices. In certain embodiments, when an application reads a file, PLFS may read and/or analyze indices from the PLFS index file and may determine whether patterns exist within the PLFS index file. In some embodiments, PLFS may merge discovered patterns into global entries applicable to an entire PLFS index. In many embodiments, PLFS may store global patterns and non-pattern entries into separate entries and may combine each respective type of entry into a single PLFS index file. In various embodiments, the contents of the PLFS index may be broadcast to other processes that may be using the PLFS index file.

In many embodiments, pattern structures may describe the access behavior of a single process. For example, in various embodiments, a process may write to a PLFS file in a typical fixed-stride pattern that may be easily described in a form of smaller size by checking if the stride is constant. In certain embodiments, strided patterns may occur when accessing parts of regular data structure. In other embodiments, more complex patterns may occur when accessing discrete parts of an array consisting of complex data types (i.e., Message Passing Interface file view with complex data types). In some embodiments, to compress complex patterns, an algorithm may be created to identify the repeating sequences and a structure to represent them in a compact way. In many embodiments, a structure may also allow random accesses without decoding. In various embodiments, an algorithm may be enabled to discover complex pattern structures and compress them.

In many embodiments, a discovery engine may use multiple windows to move through indices to discover repeating subsequences. In certain embodiments, a discovery engine may use a search window and a look-ahead window to determine whether patterns may exist within a PLFS index file. In various embodiments, a discovery engine may use structures, called pattern units, which may be used to describe each discovered pattern. For example, in an embodiment, a pattern unit may be described by the following equation:

$$[i, (d[0], d[1], \ldots)^r]$$

In this embodiment, i is the first element of an original sequence. d[] (delta) is the repeating part of an array containing the distances of any two consecutive elements in the original sequence. r is the number of repetitions. In this embodiment, an example sequence (5, 7, 10, 12, 15) can be represented as [5,(2,3)^2] which compresses the original sequence into a shorter pattern.

In many embodiments, the current disclosure may enable pattern optimization on local (per-process) metadata which may be used to create local pattern structures. In many embodiments, a global pattern structure may be constructed using local pattern structures. In various embodiments, to merge local patterns into global patterns, pattern PLFS may first sort each local pattern by their initial logical offset. In certain embodiments, pattern PLFS may go through each pattern collected to check if neighboring patterns are next to one another. In other embodiments, a global pattern may be a collection of consecutive repeating local patterns. In many embodiments, an algorithm may be enabled to use a sliding window algorithm to discover common patterns in data accesses and store them in a data structure that may enable PLFS to conduct lookups without decompressing the index.

Figure 1:
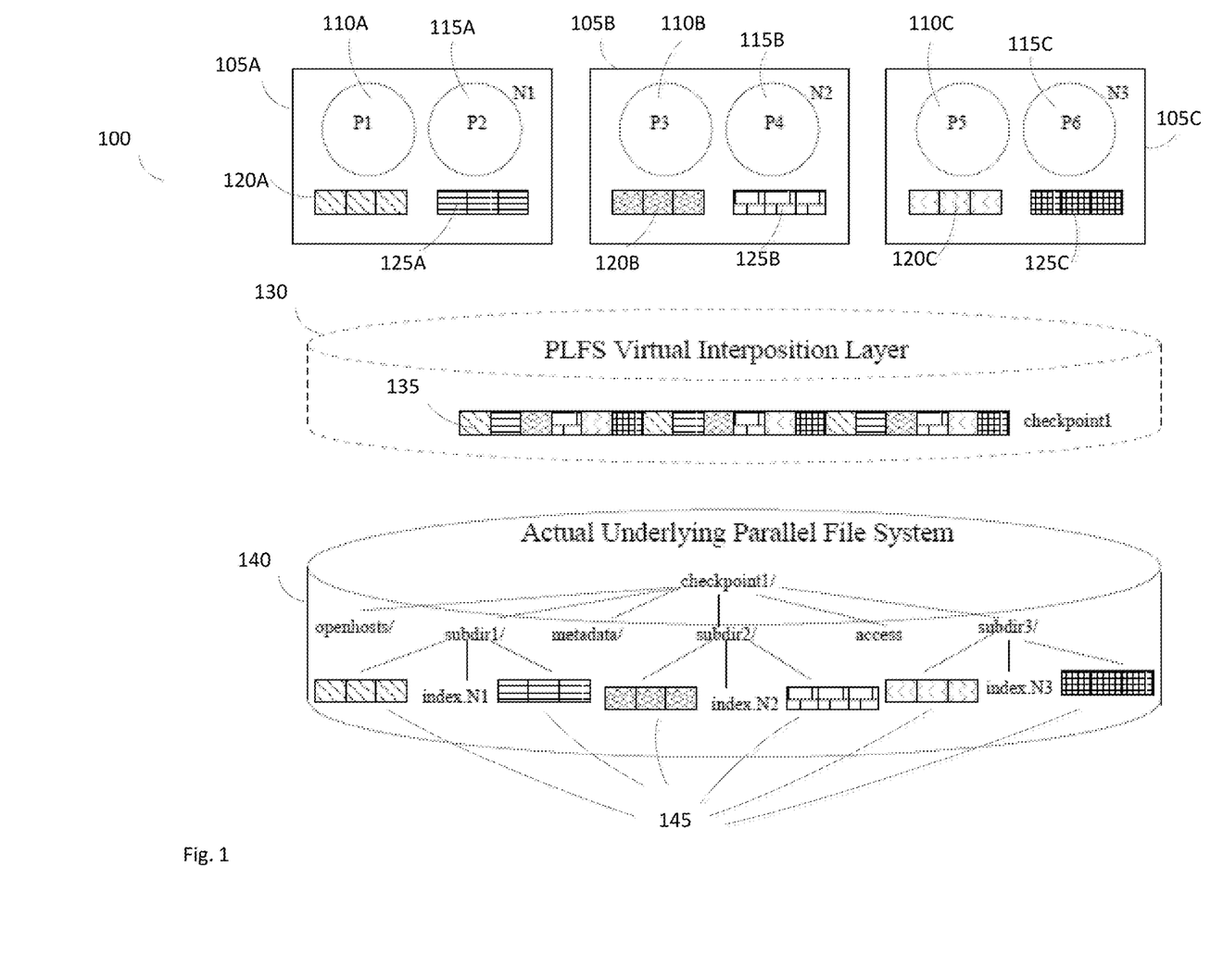
FIG. 1 is a simplified illustration of a Parallel-Logged File System (PLFS), in accordance with an embodiment of the present disclosure.

Refer to the example embodiment of FIG. 1. FIG. 1 is a simplified illustration of PLFS, in accordance with an embodiment of the present disclosure. As shown, PLFS 100 reorganizes an N-to-1 strided checkpoint file 135 onto the underlying parallel file system 140. Compute nodes 105A, 105B, 105C include processes 110A, 115A, 110B, 115B, 110C, 115C and process states 120A, 125A, 120B, 125B, 120C, 125C. Process state 120A is associated with process 110A and process state 125A is associated with process 115A. Process state 120B is associated with process 110B and process state 125B is associated with process 115B. Process state 120C is associated with process 110C and process state 125C is associated with process 115C. Processes 110A, 115A, 110B, 115B, 110C, 115C create checkpoint file 135 on PLFS 130 causing PLFS 130 to create container structure 145 on underlying parallel file system 140. Container structure 145 includes a top-level directory and several sub-directories to store application data. In many embodiments, for each write, PLFS may append incoming data to the corresponding data file and may append a record onto the appropriate index file. In various embodiments, each record may contain the length of the write, its logical offset, and a pointer to its physical offset within the data file to which it was appended. In other embodiments, to resolve reads, PLFS may aggregate each index file to create a lookup table for the logical file.

Figure 2:
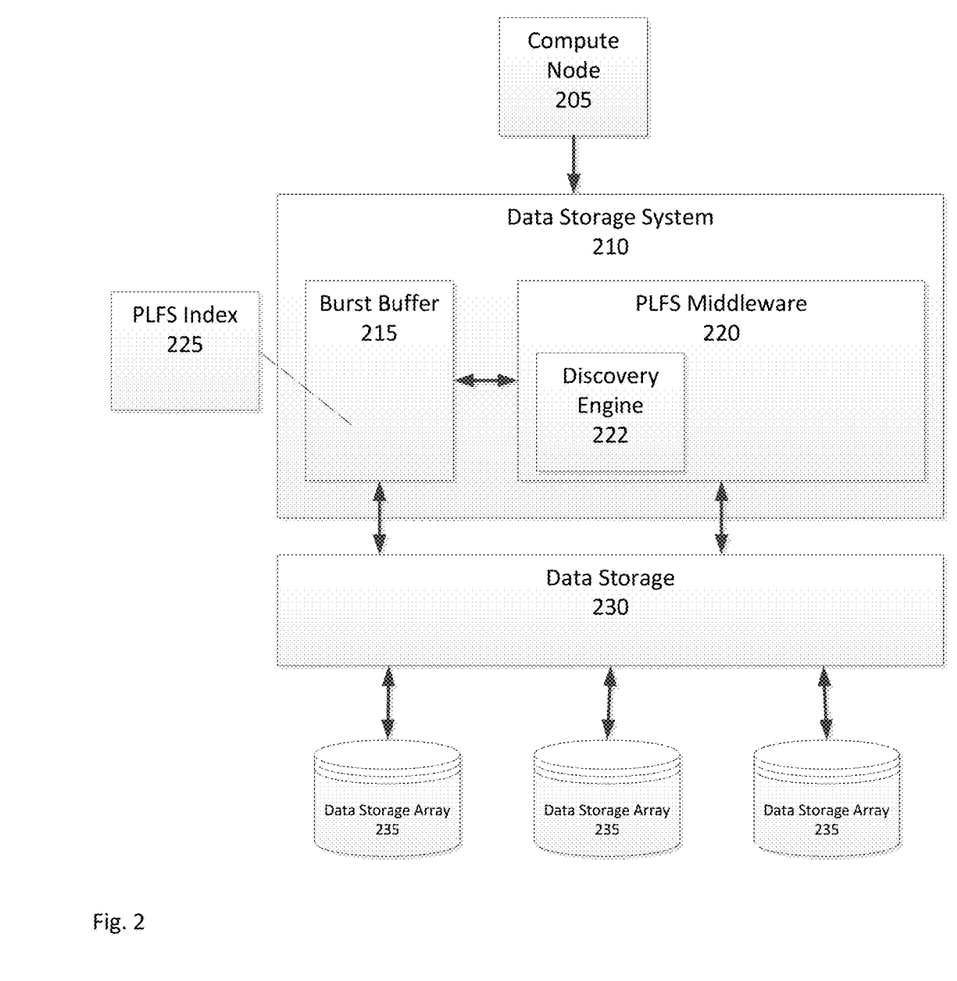
FIG. 2 is a simplified illustration of an implementation of a Pattern enabled PLFS, in accordance with an embodiment of the present disclosure.

Refer to the example embodiment of FIG. 2. FIG. 2 is a simplified illustration of an implementation of a Pattern enabled PLFS, in accordance with an embodiment of the present disclosure. As shown, data storage system 210 includes PLFS middleware 220, Burst Buffer 215, and is in communication with data storage 230. Data storage 230 includes one or more data storage arrays 235. In this embodiment, PLFS Middleware 220 creates a PLFS index 225 which is enabled to be accessed from burst buffer 215. PLFS index 225 contains information related to the mapping of data and/or data I/Os sent to data storage system 210 by compute node 205 and how PLFS middleware 220 stores the data and/or data I/Os on data storage 230. In many embodiments, a PLFS index may contain logical offsets and lengths of each write to a data storage system. In this embodiment, PLFS index 225 contains single entries and pattern entries that map to data and/or data I/Os stored on data storage 230.

Figure 3:
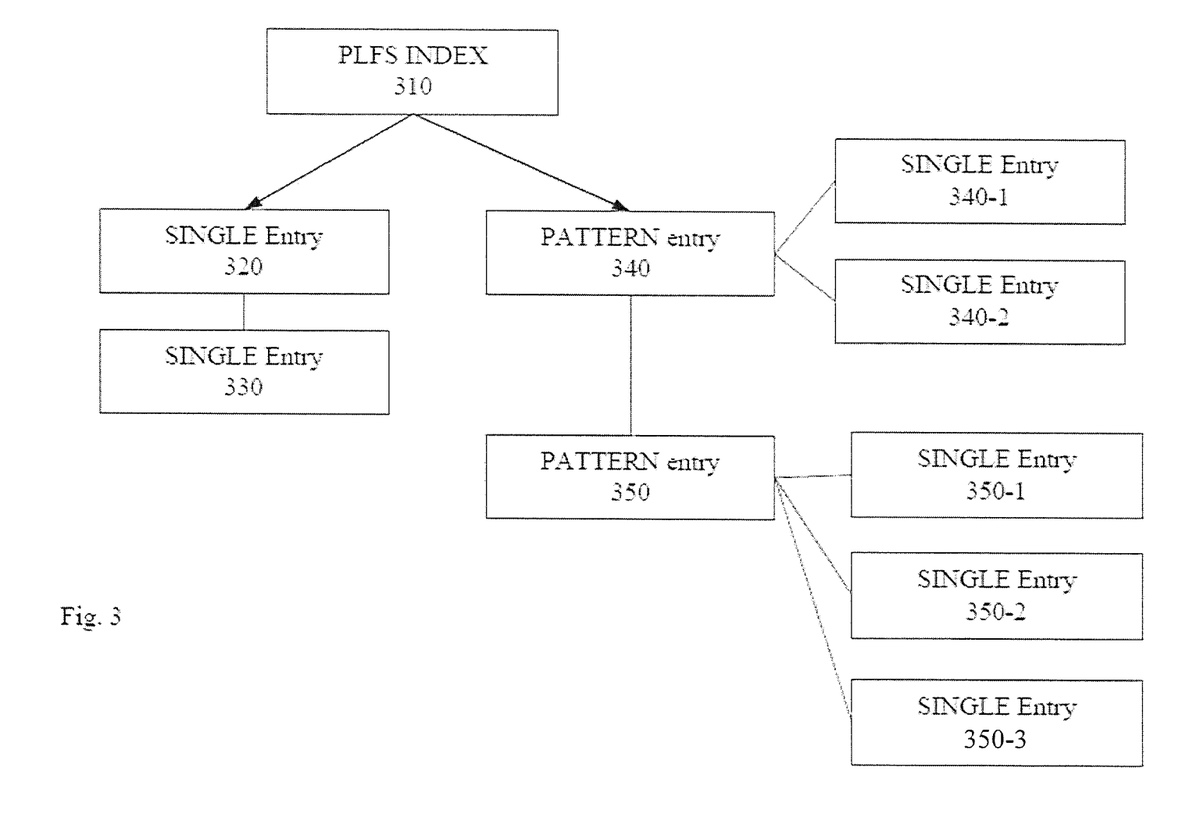
FIG. 3 is a simplified illustration of a structure of a PLFS index file, in accordance with an embodiment of the present disclosure.

Refer to the example embodiment of FIG. 3. FIG. 3 is a simplified illustration of a structure of a PLFS index file, in accordance with an embodiment of the present disclosure. As shown, PLFS Index 310 includes multiple entries which correspond to data and/or data I/Os mapped by PLFS. In this embodiment, PLFS index 310 includes single entry 320, single entry 330, pattern entry 340, and pattern entry 350. Pattern entries 340, 350 represent more than one single entry. Pattern entry 340 represents single entries 340-1, 340-2. Pattern entry 350 represents single entry 350-1, 350-2, 350-3. By consolidating single entries 340-1, 340-2, 350-1, 350-2, 350-3 into pattern entries 340, 350 respectively enables PLFS index 310 be smaller and consume less data storage.

Figure 4:
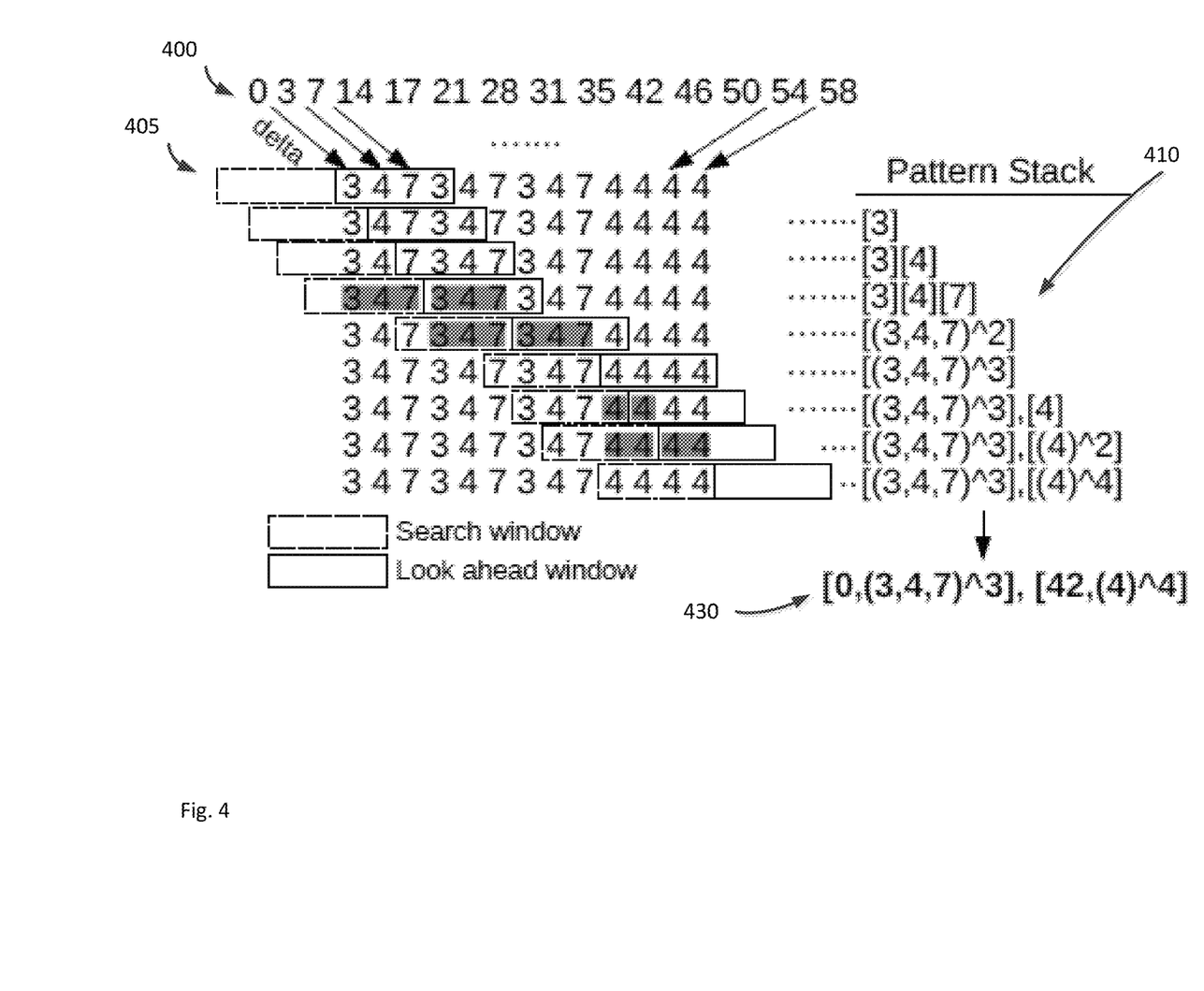
FIG. 4 is a simplified illustration of a discovery engine in a PLFS processing a PLFS index file, in accordance with an embodiment of the present disclosure.

Refer to the example embodiment of FIG. 4. FIG. 4 is a simplified illustration of a discovery engine in PLFS parsing offsets, in accordance with an embodiment of the current disclosure. As shown, a discovery engine within PLFS is parsing offsets pointed to by arrow 400. Discovery engine determines the delta between each offset provided. As pointed to by arrow 405, the discovery engine has determined that the deltas for this set of offsets are "3,4,7,3,4,7, 3,4,7,4,4,4." The discovery engine processes the deltas using a search window and a look ahead window. The two windows move along the deltas to find repeating subsequences. To represent a pattern of a sequence of numbers in a compact way, a pattern unit is used, shown by arrow 410. In this embodiment, discovery engine creates pattern unit 430 which represents the offsets pointed to by arrow 400.

Figure 5:
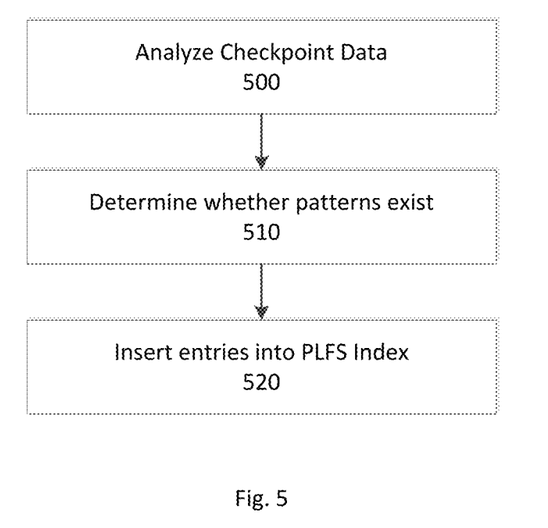
FIG. 5 is a simplified flowchart of a method of optimizing a PLFS index in a data storage system, in accordance with an embodiment of the present disclosure.

Refer to the example embodiments of FIGS. 2 and 5. FIG. 5 is a simplified flowchart of a method of optimizing a PLFS index in a data storage system as shown in FIG. 2, in accordance with an embodiment of the present disclosure. As shown, data storage system includes PLFS middleware 220, burst buffer 215, and is in communication with data storage 230 and compute node 205. In this embodiment, compute node 205 periodically creates a checkpoint and writes the checkpoint to data storage system 210. PLFS middleware 220 receives checkpoint and pre-processes the checkpoint for storage on data storage 230. PLFS middleware 220 uses discovery engine 222 to analyze the pre-processed checkpoint data (Step 500). Discovery engine 222 determines whether one or more patterns exist within the pre-processed checkpoint data (Step 510). If one or more patterns exist within the pre-processed checkpoint data, discovery engine 222 is enabled to create one or more pattern units and inserts each pattern unit into PLFS index 225 (Step 520).

Figure 6:
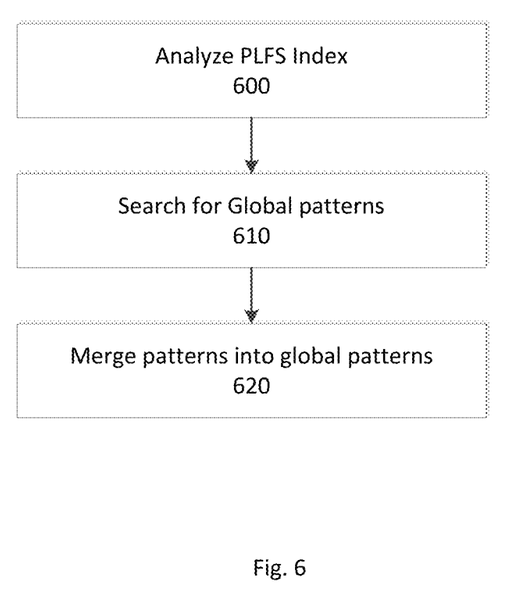
FIG. 6 is an alternative simplified flowchart of a method of optimizing a PLFS index in a data storage system, in accordance with an embodiment of the present disclosure.

Refer to the example embodiments of FIGS. 2 and 6. FIG. 6 is an alternative simplified flowchart of a method of optimizing a PLFS index in a data storage system as shown in FIG. 2, in accordance with an embodiment of the present disclosure. As shown, data storage system includes PLFS middleware 220, burst buffer 215, and is in communication with data storage 230 and compute node 205. Periodically, PLFS middleware 220 tasks discovery engine 222 to analyze PLFS index 225 (Step 600). Discovery engine 222 processes each entry within PLFS index 225 and searches for global patterns (Step 610). Upon discovering one or more global patterns, discovery engine merges found patterns into PLFS index 225 (Step 620).

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 7:
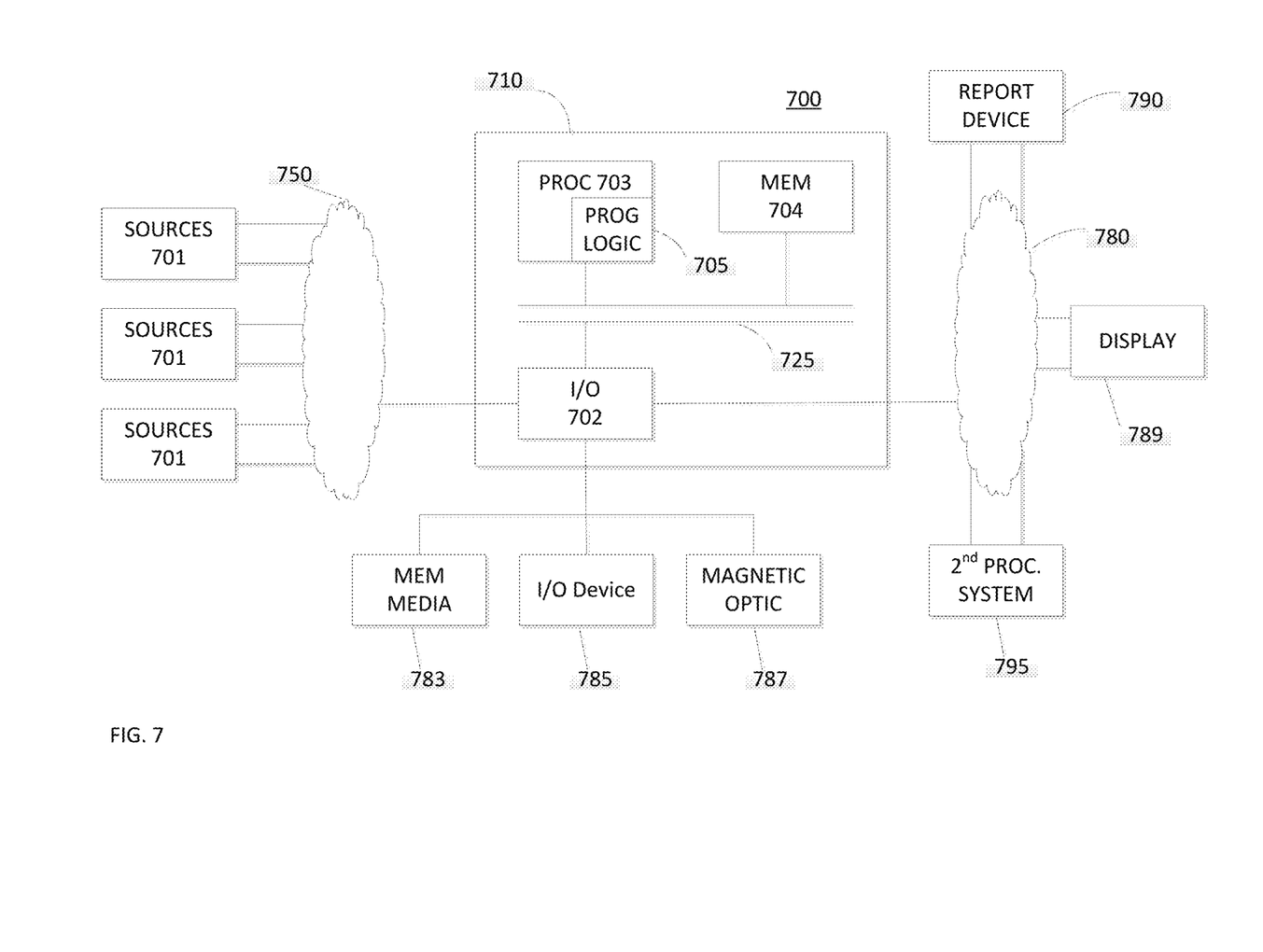
FIG. 7 is an example of an embodiment of an apparatus that may utilize the techniques described herein, in accordance with an embodiment of the present disclosure.

FIG. 7 is a block diagram illustrating an apparatus, such as a computer 710 in a network 700, which may utilize the techniques described herein according to an example embodiment of the present invention. The computer 710 may include one or more I/O ports 702, a processor 703, and memory 704, all of which may be connected by an interconnect 725, such as a bus. Processor 703 may include program logic 705. The I/O port 702 may provide connectivity to memory media 783, I/O devices 785, and drives 787, such as magnetic or optical drives. When the program code is loaded into memory 704 and executed by the computer 710, the machine becomes an apparatus for practicing the invention. When implemented on one or more general-purpose processors 703, the program code combines with such a processor to provide a unique apparatus that operates analogously to specific logic circuits. As such, a general purpose digital machine can be transformed into a special purpose digital machine.

Figure 8:
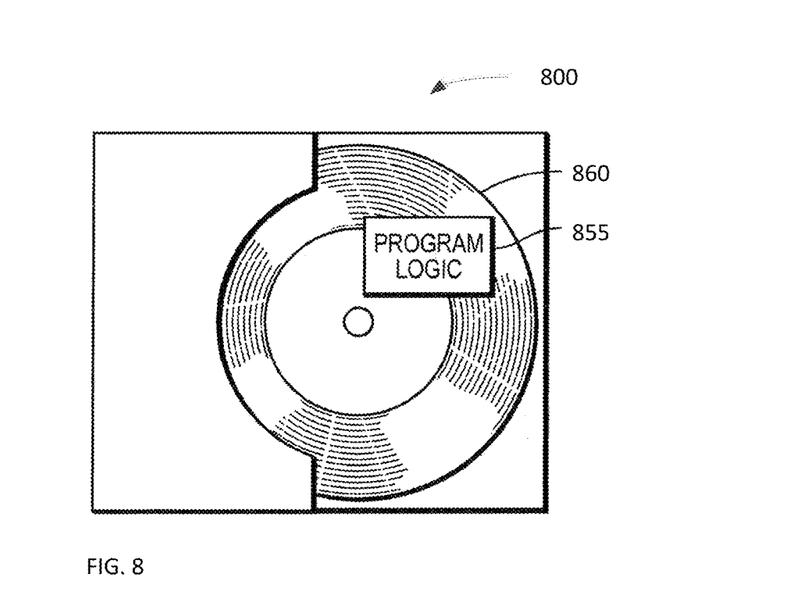
FIG. 8 is an example of a method embodied on a computer readable storage medium that may utilize the techniques described herein, in accordance with an embodiment of the present disclosure.

FIG. 8 is a block diagram illustrating a method embodied on a computer readable storage medium 860 that may utilize the techniques described herein according to an example embodiment of the present invention. FIG. 8 shows Program Logic 855 embodied on a computer-readable medium 860 as shown, and wherein the Logic is encoded in computer-executable code configured for carrying out the methods of this invention and thereby forming a Computer Program Product 800. Program Logic 855 may be the same logic 705 on memory 704 loaded on processor 703 in FIG. 7. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-8. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of managing a Parallel-Logged File System (PLFS) on a data storage system, wherein the data storage system is in communication with an application that updates the data storage system with checkpoint data, the computer-executable method comprising:
   receiving a first checkpoint including the checkpoint data from the application;
   analyzing the checkpoint data in the first checkpoint to determine whether a pattern exists in the checkpoint data, wherein the analyzing comprises:
      pre-processing the checkpoint data, using a discovery engine within the data storage system, by creating a list of deltas from the checkpoint data, wherein the deltas are calculated between respective pairs of offsets of a plurality of offsets recorded for a plurality of writes for one or more compute nodes;
      analyzing the list of deltas by using a look-ahead window to determine whether a pattern exists;
      wherein the look-ahead window comprises a size accommodating less than all of the deltas;
      wherein using the look-ahead window to determine whether a pattern exists comprises incrementally moving the look-ahead window along the deltas to find one or more deltas in a repeating sequence; and
   upon a positive determination, adding the pattern as a corresponding pattern entry into the PLFS; and
   consolidating multiple patterns within the PLFS, wherein the consolidated multiple patterns reduce a size of a PLFS metadata index;
   wherein the adding comprises creating the corresponding pattern entry; and
   wherein the corresponding pattern entry indicates the one or more deltas in the repeating sequence and a corresponding number of each of the repetitions of the repeating sequence.

2. The computer-executable method of claim 1, wherein the adding further comprises:
   inserting the corresponding pattern entry in the PLFS metadata index.

3. The computer-executable method of claim 2, further comprising:
   analyzing the PLFS metadata index for a global pattern; and
   creating a second corresponding pattern entry for the global pattern; and
   removing one or more entries from the PLFS metadata index associated with the global pattern; and
   representing the removed one or more entries with the second corresponding pattern entry in the PLFS metadata index.

4. The computer-executable method of claim 3, wherein the global pattern is a collection of repeating patterns within the PLFS metadata index.

5. The computer-executable method of claim 1, wherein the corresponding pattern entry represents a plurality of single entries.

6. The computer-executable method of claim 1, wherein the analyzing of the list of deltas comprises using a search window in addition to the look-ahead window to determine whether a pattern exists.

7. The computer-executable method of claim 6, wherein using the search window to determine whether a pattern exists comprises incrementally moving the search window with the look-ahead window along the deltas to find the one or more deltas in the repeating sequence.

8. A system, comprising:
   a host system running an application;
   a data storage system running a Parallel-Logged File system (PLFS), wherein the data storage system is in communication with the application that updates the data storage system with checkpoint data; and
   computer-executable logic encoded in memory of one or more computers in communication with the data storage system to enable the management of the PLFS on the data storage system, wherein the computer-executable program logic is configured for the execution of:
   receiving a first checkpoint including the checkpoint data from the application;
   analyzing the checkpoint data in the first checkpoint to determine whether a pattern exists in the checkpoint data, wherein the analyzing comprises:
      pre-processing the checkpoint data, using a discovery engine within the data storage system, by creating a list of deltas from the checkpoint data, wherein the deltas are calculated between respective pairs of offsets of a plurality of offsets recorded for a plurality of writes for one or more compute nodes;
      analyzing the list of deltas by using a look-ahead window to determine whether a pattern exists;
      wherein the look-ahead window comprises a size accommodating less than all of the deltas;

wherein using the look-ahead window to determine whether a pattern exists comprises incrementally moving the look-ahead window along the deltas to find one or more deltas in a repeating sequence; and upon a positive determination, adding the pattern as a corresponding pattern entry into the PLFS; and consolidating multiple patterns within the PLFS, wherein the consolidated multiple patterns reduce a size of a PLFS metadata index;

wherein the adding comprises creating the corresponding pattern entry; and wherein the corresponding pattern entry indicates the one or more deltas in the repeating sequence and a corresponding number of each of the repetitions of the repeating sequence.

9. The system of claim 8, wherein the adding further comprises:

inserting the corresponding pattern entry in the PLFS metadata index.

10. The system of claim 9, wherein the computer-executable program logic is further configured for the execution of:

analyzing the PLFS metadata index for a global pattern; and creating a second corresponding pattern entry for the global pattern; and removing one or more entries from the PLFS metadata index associated with the global pattern; and representing the removed one or more entries with the second corresponding pattern entry in the PLFS metadata index.

11. The system of claim 10, wherein the global pattern is a collection of repeating patterns within the PLFS metadata index.

12. The system of claim 8, wherein the corresponding pattern entry represents a plurality of single entries.

13. The system of claim 8, wherein the analyzing of the list of deltas comprises using a search window in addition to the look-ahead window to determine whether a pattern exists.

14. The system of claim 13, wherein using the search window to determine whether a pattern exists comprises incrementally moving the search window with the look-ahead window along the deltas to find the one or more deltas in the repeating sequence.

15. A computer program product for managing a Parallel-Logged File System (PLFS) on a data storage system, wherein the data storage system is in communication with an application that updates the data storage system with checkpoint data, the computer program product comprising:

a non-transitory computer readable medium encoded with computer-executable program code configured to enable the execution of:

receiving a first checkpoint including the checkpoint data from the application;

analyzing the checkpoint data in the first checkpoint to determine whether a pattern exists in the checkpoint data, wherein the analyzing comprises:

pre-processing the checkpoint data, using a discovery engine within the data storage system, by creating a list of deltas from the checkpoint data, wherein the deltas are calculated between respective pairs of offsets of a plurality of offsets recorded for a plurality of writes for one or more compute nodes;

analyzing the list of deltas by using a look-ahead window to determine whether a pattern exists;

wherein the look-ahead window comprises a size accommodating less than all of the deltas;

wherein using the look-ahead window to determine whether a pattern exists comprises incrementally moving the look-ahead window along the deltas to find one or more deltas in a repeating sequence; and upon a positive determination, adding the pattern as a corresponding pattern entry into the PLFS; and consolidating multiple patterns within the PLFS, wherein the consolidated multiple patterns reduce a size of a PLFS metadata index;

wherein the adding comprises creating the corresponding pattern entry; and wherein the corresponding pattern entry indicates the one or more deltas in the repeating sequence and a corresponding number of each of the repetitions of the repeating sequence.

16. The computer program product of claim 15, wherein the adding further comprises:

inserting the corresponding pattern entry in the PLFS metadata index.

17. The computer program product of claim 16, wherein the code is further configured to enable the execution of:

analyzing the PLFS metadata index for a global pattern; and creating a second corresponding pattern entry for the global pattern; and removing one or more entries from the PLFS metadata index associated with the global pattern; and representing the removed one or more entries with the second corresponding pattern entry in the PLFS metadata index.

18. The computer program product of claim 17, wherein the global pattern is a collection of repeating patterns within the PLFS metadata index.

19. The computer program product of claim 15, wherein the analyzing of the list of deltas comprises using a search window in addition to the look-ahead window to determine whether a pattern exists.

20. The computer program product of claim 19, wherein using the search window to determine whether a pattern exists comprises incrementally moving the search window with the look-ahead window along the deltas to find the one or more deltas in the repeating sequence.

* * * * *

UNITED STATES PATENT AND TRADEMARK OFFICE
CERTIFICATE OF CORRECTION

PATENT NO. : 10,558,618 B1
APPLICATION NO. : 14/041872
DATED : February 11, 2020
INVENTOR(S) : John M. Bent et al.

Page 1 of 1

It is certified that error appears in the above-identified patent and that said Letters Patent is hereby corrected as shown below:

In the Specification

Column 7, Line 3 after the sentence ending "such as magnetic or optical drives," please insert --The computer 710 is coupled to a plurality of sources 701 via a network 750 and the I/O port 702. The computer 710 is further coupled to a display 789, a report device 790, and a second processing system 795 via a network 780 and the I/O port 702.--

Signed and Sealed this
Seventeenth Day of March, 2020

Andrei Iancu
*Director of the United States Patent and Trademark Office*